7 Sheets--Sheet 1.

G. H. & E. MORGAN.

Carriages.

No. 5,761.

Reissued Feb. 10, 1874.

Witnesses.

E. N. Johnson

J. P. Cranford

Inventors.

Geo. H. Morgan

Edward Morgan

E. G. Dufour

Atty.

7 Sheets--Sheet 2.

G. H. & E. MORGAN.

Carriages.

No. 5,761

Reissued Feb. 10, 1874.

Witnesses.

E. H. Johnson

J. P. Crawford

Inventors.

Geo. H. Morgan

Edward Morgan

L. A. Barrin

Atty.

G. H. & E. MORGAN.

Carriages.

No. 5,761. Reissued Feb. 10, 1874.

Witnesses.

E. N. Johnson

J. P. Crawford

Inventors.

Geo H. Morgan

Edward Morgan

L. A. Omgin

Atty.

G. H. & E. MORGAN.

Carriages.

No. 5,761. Reissued Feb. 10, 1874.

Witnesses.

E. H. Johnson

L. P. Crawford

Inventors.

Geo H. Morgan

Edward Morgan

H. A. Dingee

Atty.

G. H. & E. MORGAN.

Carriages.

No. 5,761. Reissued Feb. 10, 1874.

Witnesses.

E. N. Johnson

J. P. Lorrainford

Inventors.

Geo. H. Morgan

Edward Morgan

C. A. Dwight Atty.

7 Sheets--Sheet 6.

G. H. & E. MORGAN.

Carriages.

No. 5,761

Reissued Feb. 10, 1874.

Witnesses.

E. N. Johnson

J. P. Stranford

Inventors.

Geo. H. Morgan

Edward Morgan

C. Morgan

Atty.

G. H. & E. MORGAN.

Carriages.

No. 5,761. Reissued Feb. 10, 1874.

Witnesses.

E. A. Johnson

J. P. Crawford

Inventors.

Geo. H. Morgan

Edward Morgan

Atty.

UNITED STATES PATENT OFFICE.

GEORGE H. MORGAN AND EDWARD MORGAN, OF EDGEWARE ROAD, ENGLAND.

IMPROVEMENT IN CARRIAGES.

Specification forming part of Letters Patent No. 59,526, dated November 6, 1866; reissue No. 5,761, dated February 10, 1874; application filed August 14, 1873.

*To all whom it may concern:*

Be it known that we, GEORGE H. MORGAN and EDWARD MORGAN, both of Edgeware Road, Sussex county, England, have invented certain Improvements in Carriages, of which the following is a specification:

Our invention relates to carriages, landaus, wagonettes, &c.; and consists in a novel construction, combination, and arrangement of parts which have for their object to enable the head or cover of the vehicle to be manipulated from the driver's seat, or other convenient part of the carriage, as will be fully hereafter set forth.

Figure 1:
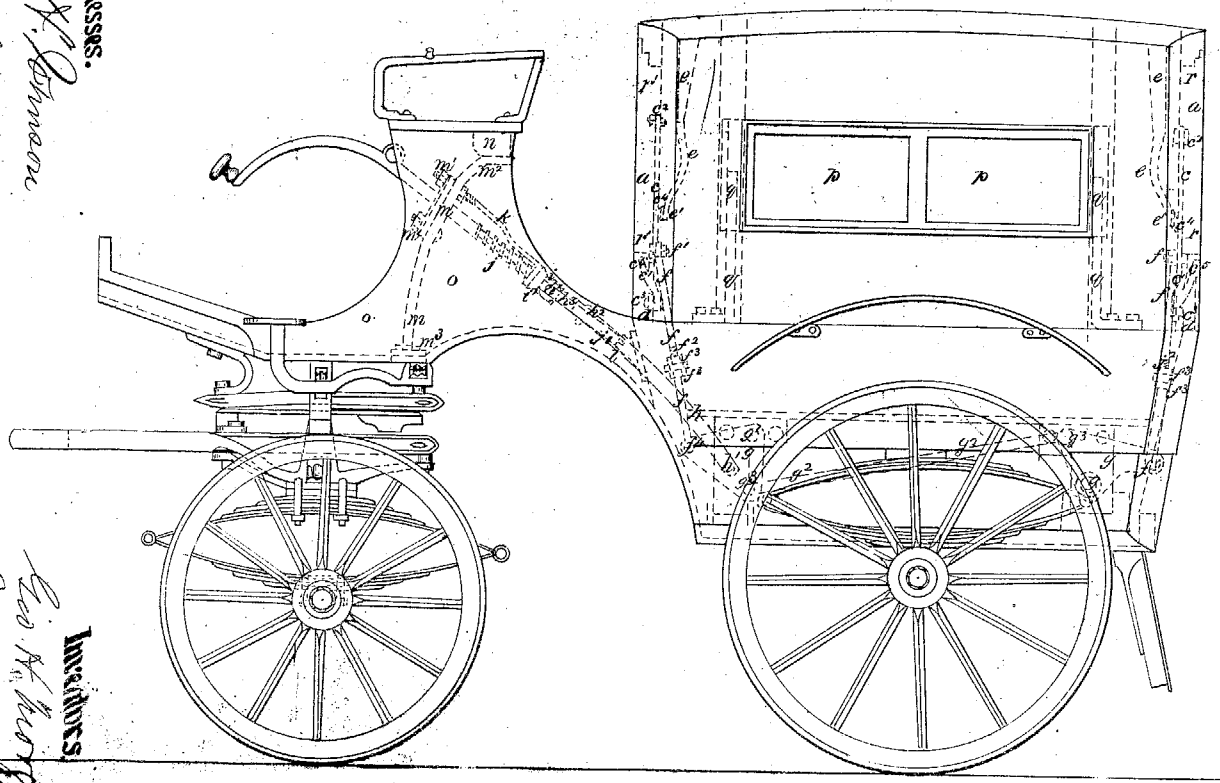
Figure 2:
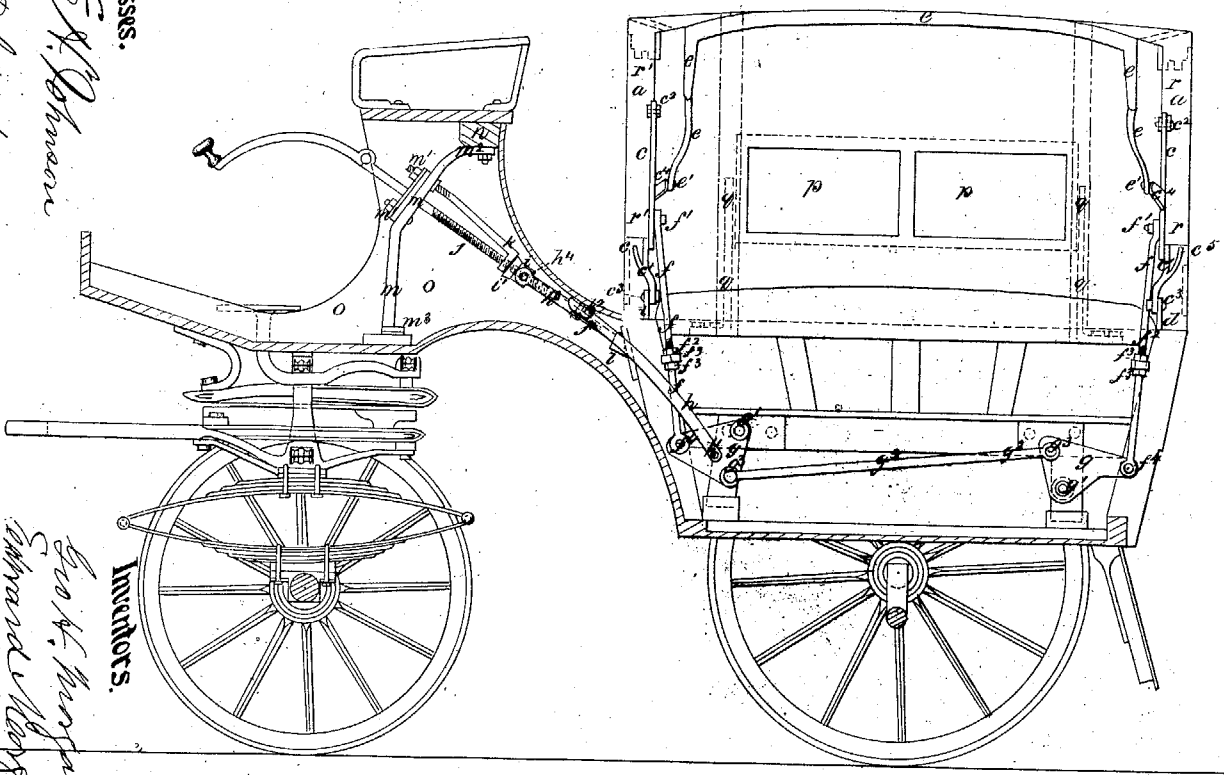
Figure 3:
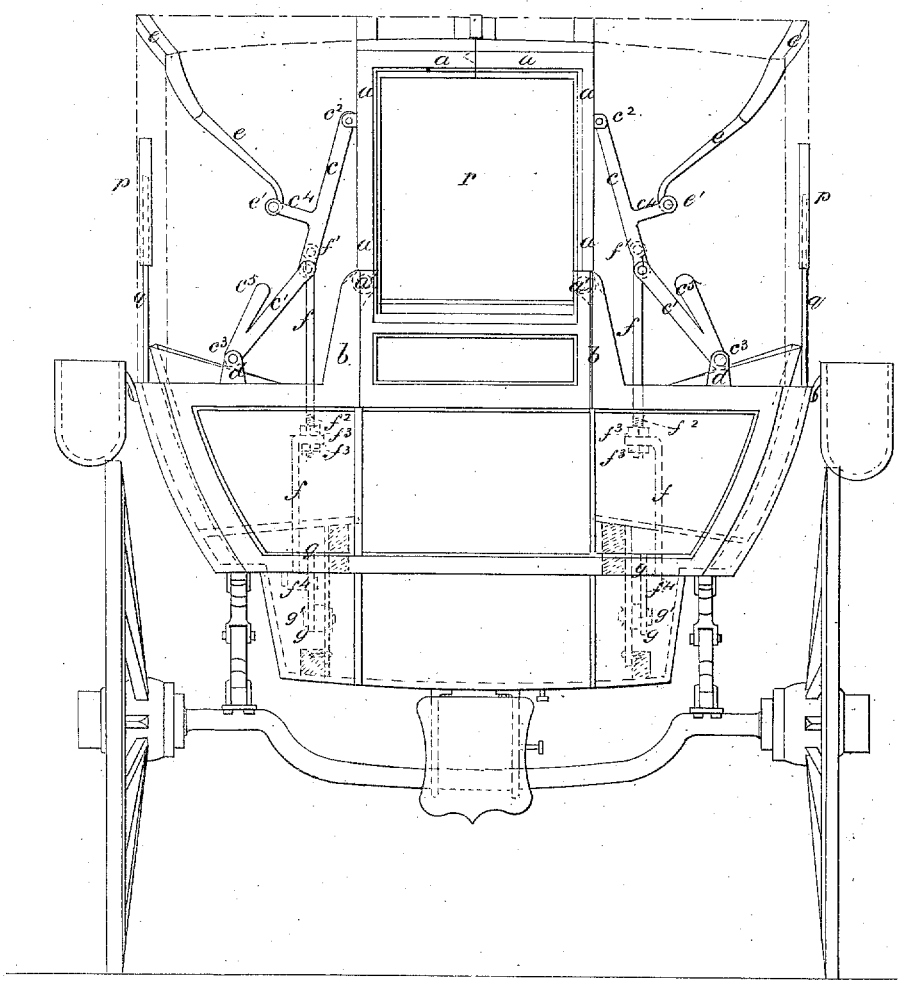
Figure 4:
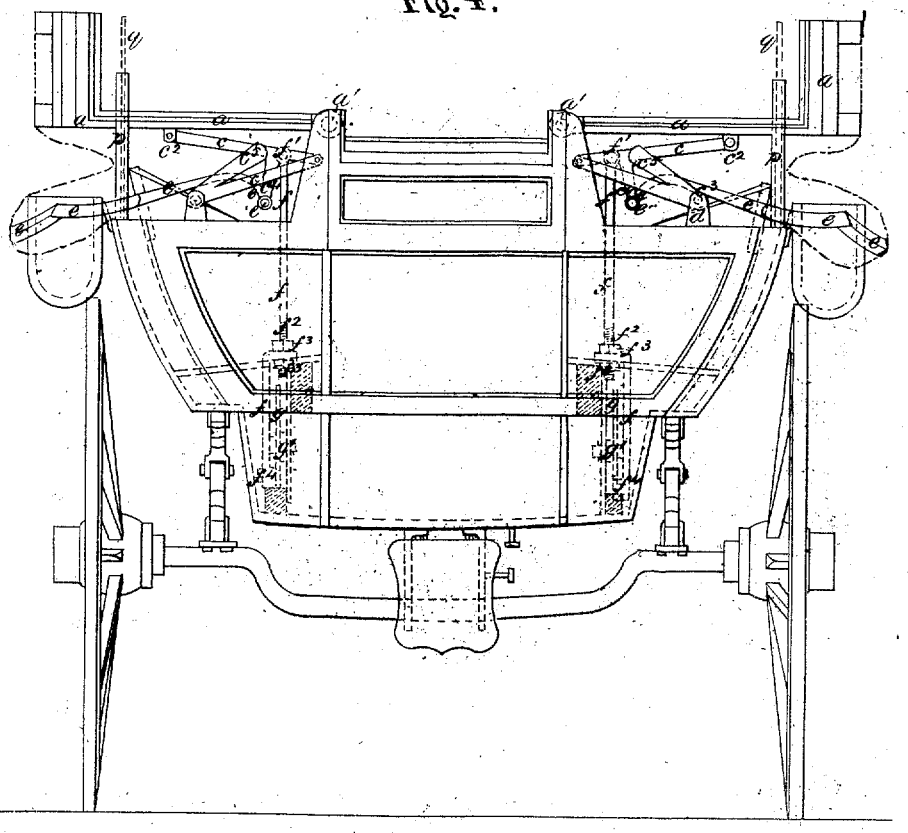
Figure 5:
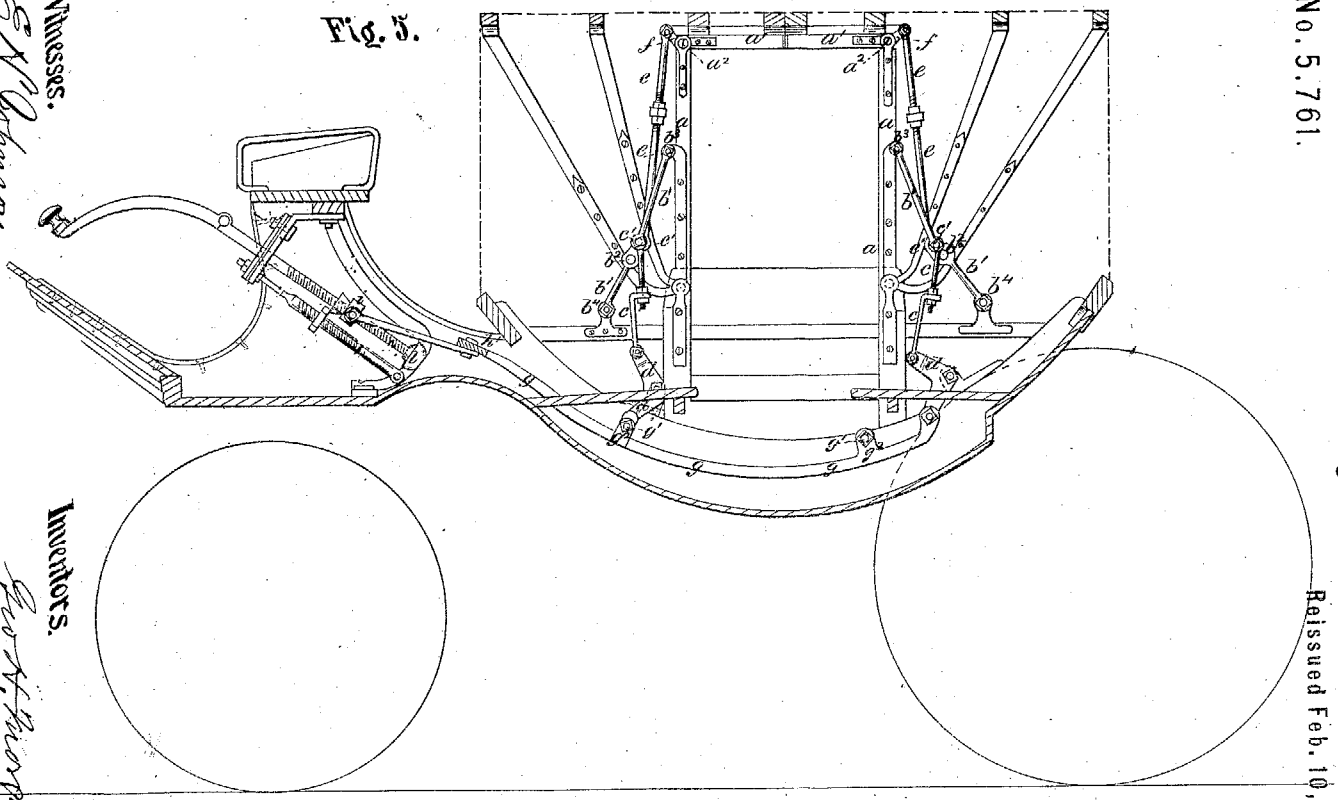

Fig. 1 is a side view of a wagonette with our improvements; Fig. 2, a sectional view of Fig. 1. Fig. 3 is an end view of the same; Fig. 4, a similar view to Fig. 3, with the parts in a different position. Fig. 5 is a sectional view of a landau, showing the manner of applying our improvements thereto. Fig. 6 is a sectional view of Fig. 5.

The remaining figures are parts in detail.

The body of the carriage may be of any of the well known shapes or styles, such as those of the wagonette, landau, &c., but in describing our invention, it will be unnecessary to set forth the manner of its application and operation on all these various descriptions of vehicles, as with but slight alterations, which do not constitute invention. It can be applied to any vehicle that has a rising and falling or folding cover or head.

We will, therefore, describe its application to a wagonette, as shown at Figs. 1, 2, 3, and 4. The cover or head is made to open and close by means of a screw, which is rotated by a crank-handle on the driving-seat or elsewhere. This screw, through the medium of a nut which travels on it, and connecting-rods attached to this nut, operates a series of bell-crank or triangular plate-levers secured to each side of the body of the vehicle, and these cranks being connected with the hoop-sticks or framing of the cover by means of connecting-rods close or open the cover as they are operated by the screw. To be more particular, we will allude to each part in the drawings by letter.

*a a* is the framing forming the head of the vehicle hinged at $a^1$ to the pillars *b* of the carriage. *c c* are the upper limbs of the head-joints, and $c^1$ $c^1$ the lower limbs thereof. The upper limbs are pin-jointed at $c^2$ to the parts *a* of the head of the vehicle, while the lower limbs are pin-jointed at $c^3$ to the standard *d*, fixed to the body of the carriage. $c^4$ are projections from the upper limbs *c*, to which the hoop-sticks *e* are pin-jointed at $e^1$. By jointing the hoop-sticks, as shown in the drawing, instead of to the frame of the carriage, they are drawn in when the cover is open to a level, or nearly so, with the top framing of the head or cover. To the upper limbs are also pin-jointed at $f^1$, links or connecting-rods *f* which are formed in two parts for facility of adjustment, there being a screw-thread, $f^2$, formed on one part, which, by lock-nuts $f^3$, is connected to the other part thereof, as shown. The connecting-rods $f^4$ are pin-jointed to bell-crank or plate-levers which are capable of turning on studs or axes $g^1$ while they are connected together by connecting-rods $g^2$ pin-jointed thereto at $g^3$, as shown. *h h* are arms or rods pin-jointed at $h^1$ to the two front-bell-crank or plate-levers *g*, and are rigidly connected at their other extremity to a cross-bar, $h^2$, having arms $h^3$ fixed thereto, which are pin-jointed at $h^4$ to the nut *i*, to which a reciprocating motion is given by means by the screw *j*. The nut *i* is provided with a grease-cup, $i^1$, for purposes of lubrication, and is limited in its motion in one direction by the stop *k*, and in the other by the step or bearing *l*. The end $j^1$ of the screw *j*, is supported in the step or bearing *l*, while the other end is provided with a collar which is held between the frame *m* and the plate $m^1$, leather or other absorbent material being applied around the collar to facilitate the greasing of the bearing. The frame *m* is fixed at $m^2$ to the bar *n*, and at $m^3$ to the lower part of the driving-boot *o*. $c^5$ are projections fixed to the lower limbs of the head-joints, and act to press the cover of the carriage outward, and prevent injury thereto in the lowering of the head of the carriage. *p p* are side lights which are connected to the webbing of the head of the vehicle, and are guided in their up-and-down motion in the guides *q*. *r* is a light or window which may, when desired, be dropped into a recess formed for it in the door, and $r^1$ is another light which may be dropped into a suitable recess formed for it in the body of the carriage. The head-joints, and parts connected therewith, are placed between the cover and the lining of the carriage, and are hid thereby.

Our improvements as applied to landaus are shown at Figs. 5 and 6, where it will be observed the parts are all constructed and arranged substantially as in the wagonette. In this instance, the upper parts, $a^1$ $a^1$, of the cover or head are pivoted at $a^2$ $a^2$ to the sides of the head, so as to be capable of being thrown up, so as to be in a horizontal position in general with the other parts of the head when it is opened fully. *e e* are links, which are connected at $e^1$ $e^1$ to the lower limbs, $b^1$ $b^1$, of the head-joints, and at $e^2$ $e^2$ to the short cranks *f f* fixed to the parts $a^1$ $a^1$ of the head of the carriage; and, as the bell-cranks are operated, these links exert a pull on the short cranks *f f*, and throw the head-pieces $a^1$ $a^1$ up. By disconnecting the links *e e* from the limbs $b^1$ $b^1$ of the head, the parts $a^1$ $a^1$ can be thrown up by a person inside the carriage.

Figure 9:
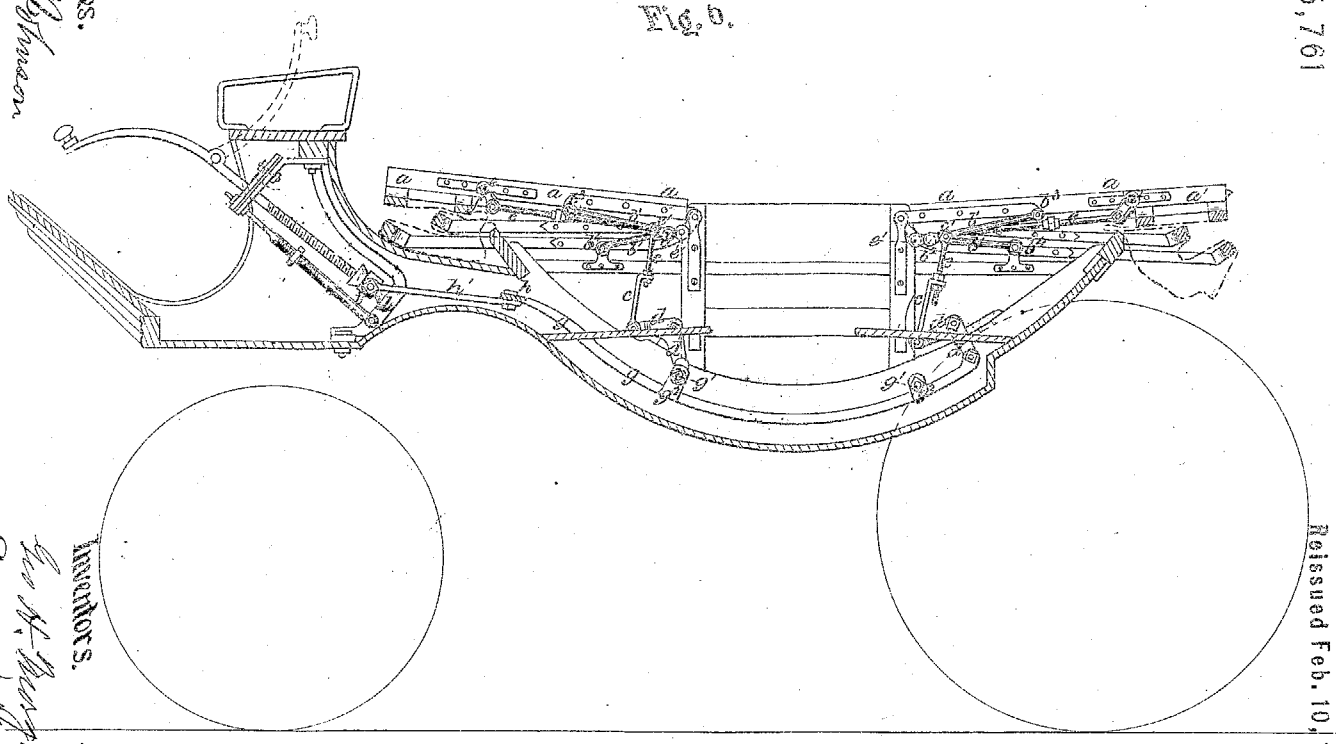
Figure 9:
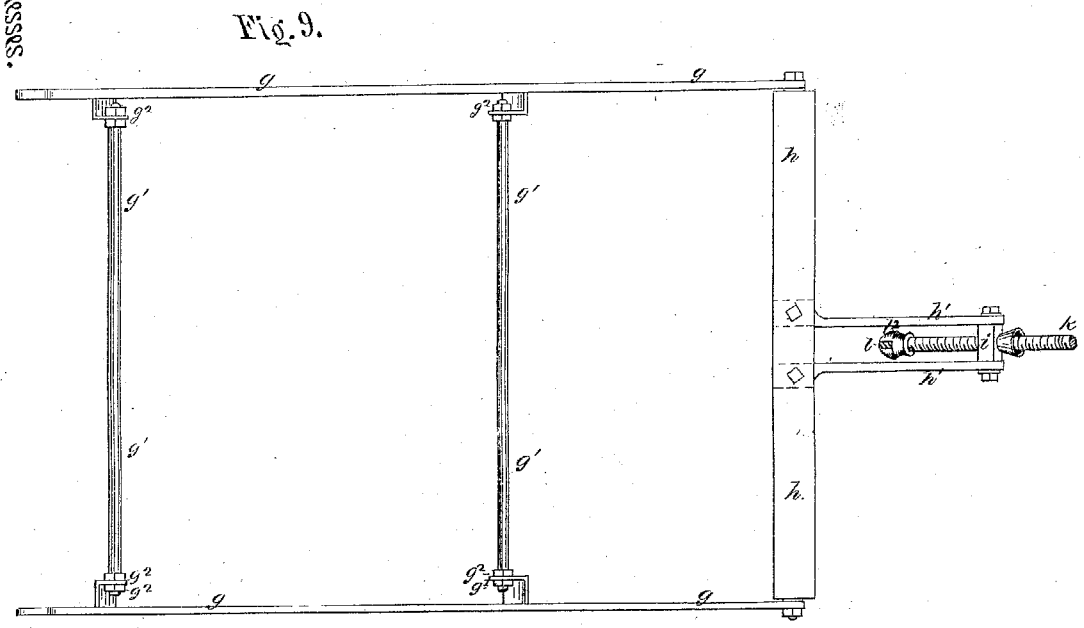
Figure 8:
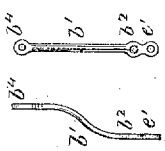
Figure 7:
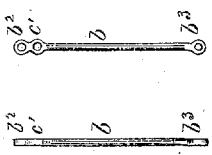

The parts are so constructed and arranged as to allow the head to be operated on directly by hand independently of the bell-cranks or screw. The head of the carriage can be opened or closed by a person from the inside by first disconnecting the connecting-rods *f* from the cranks, and operating the cover directly by hand. The disconnection may be effected at the adjusting-nut of the connecting-rod, or at the point where this rod is jointed to the head of the carriage. The connecting-rods *g g* are connected together transversely by rods or bars $g^1$ $g^1$, (see Fig. 9,) the extremities of which rods are furnished with screw-threads and lock-nuts $g^2$ $g^2$, for affording a means of adjustment to varying widths. The crank-handle, by which the screw is rotated, is pin-jointed thereto, so that it can be thrown up out of the way when not in use.

The operation of the parts above described will be as follows: The head or cover of the vehicle being supposed to be closed, on desiring to open it, the crank-handle of the screw is turned by the person on the driving-seat in a direction to force the nut down, which will, through the medium of its connecting-rods, act on the front bell-crank lever, and turn it on its pivot; and this crank will, through the connecting-rod $g^2$, act on the rear crank in a like manner, and the cranks, exerting a pull on the connecting-rods connecting them with the folding parts of the head, will open the head, to close which it is only necessary to turn the screw in the reverse direction, when the same movements, only in the reverse direction, take place, and the head is consequently closed.

I claim—

1. The combination, with a wagonette or other vehicle, of the mechanism for raising and lowering the head or covering thereof, consisting of the screw *j*, nut *i*, connecting-rods *h h*, bell-cranks *g*, and connecting-rods *f f*, arranged to be operated from the driver's seat or other part of the carriage, substantially in the manner described.

2. The side lights *p p*, applied to the head or covers of wagonettes or other vehicles, and so constructed that they may rise and fall with the heads or covers, and be guided in their motion through the medium of the ways or guides *q*, substantially in the manner described.

3. The connecting-rods *f f*, applied to carriages, in two parts, and connected together to facilitate adjustment, substantially in the manner described.

4. The connecting-rods *g g*, connected together, so as to form a rigid frame by the rods or bars $g^1$ $g^1$, provided with screw-threads, and coupled to the connecting-rods by lock-nuts $g^2$ $g^2$, substantially in the manner described.

5. The combination of the screw *j*, frame *m*, plates *m'*, and step *l*, substantially in the manner and for the purpose specified.

6. The combination, with the screw *j*, nut *i*, and connecting-rods *h h*, of the stops *k l*, for limiting the extent of motion of the nut in either direction, substantially in the manner described and specified.

7. The combination, with the back *a* and top $a^1$ of the carriage-head, of the jointed rods *e* $b^1$ $b^1$ and their connections, constructed to operate substantially in the manner and for the purpose described.

8. A carriage-head with the jointed rods *e* $b^1$ $b^1$ and connections, so constructed that, if the mechanism for automatically operating the head be disconnected, either head-piece can be raised or lowered by moving the jointed parts, as described.

GEORGE H. MORGAN.
EDWARD MORGAN.

Witnesses:
WILLIAM CONQUEST.
GEO. WILLIS.